United States Patent
Thompson et al.

(10) Patent No.: US 10,104,219 B2
(45) Date of Patent: Oct. 16, 2018

(54) TRACKING ACTIVITY DATA BETWEEN WEARABLE DEVICES PAIRED WITH A COMPANION DEVICE

(71) Applicant: Apple Inc., Cupertino, CA (US)

(72) Inventors: Aaron P. Thompson, San Francisco, CA (US); Brian R. Drell, San Jose, CA (US); Todd A. Shortlidge, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/662,143

(22) Filed: Jul. 27, 2017

(65) Prior Publication Data

US 2017/0366657 A1  Dec. 21, 2017

Related U.S. Application Data

(62) Division of application No. 15/188,054, filed on Jun. 21, 2016, now Pat. No. 9,866,671.

(51) Int. Cl.

| | |
|---|---|
| *H04M 1/725* | (2006.01) |
| *H04W 76/14* | (2018.01) |
| *H04W 4/70* | (2018.01) |
| *H04W 4/80* | (2018.01) |
| *A63B 24/00* | (2006.01) |
| *H04B 1/3827* | (2015.01) |
| *H04L 29/08* | (2006.01) |
| *G06F 3/01* | (2006.01) |
| *G01C 22/00* | (2006.01) |

(Continued)

(52) U.S. Cl.
CPC ....... *H04M 1/7253* (2013.01); *A63B 24/0062* (2013.01); *G06F 3/014* (2013.01); *H04B 1/385* (2013.01); *H04L 67/22* (2013.01); *H04W 4/70* (2018.02); *H04W 4/80* (2018.02); *H04W 76/14* (2018.02); *H05K 999/99* (2013.01); *G01C 22/006* (2013.01); *G06F 3/017* (2013.01); *G06F 3/0346* (2013.01); *H04W 12/02* (2013.01)

(58) Field of Classification Search
CPC ....... H04M 1/7253; H04W 4/70; H04W 4/80; H04W 12/02; H04W 76/14; H04B 1/385; H04L 67/22; A63B 24/0062; G01C 22/006; G06F 3/014; G06F 3/017; G06F 3/0346

See application file for complete search history.

(56) References Cited

U.S. PATENT DOCUMENTS

| | | |
|---|---|---|
| 9,079,059 B2 | 7/2015 | Cardoso, Jr. et al. |
| 2014/0237028 A1 | 8/2014 | Messenger et al. |

(Continued)

FOREIGN PATENT DOCUMENTS

| | | |
|---|---|---|
| WO | WO 2015/116163 | 8/2015 |

OTHER PUBLICATIONS krypted.com (http://krypted.com/), Tiny Deathstars of Foulness, "Apple Watch and Achievements", downloaded Feb. 11, 2016, http://krypted.com/wearable-technology/apple-watch-and-achievements/.

(Continued)

*Primary Examiner* — Raymond Dean
(74) *Attorney, Agent, or Firm* — Womble Bond Dickinson (US) LLP

(57) ABSTRACT

A set of wearable devices, each paired with a companion device, are configured to cumulatively maintain data about physical activities even though a user may switch between wearing them over a period of time. For example, a streak of workouts over many days can be maintained while the user switches between two watches over that period of time.

23 Claims, 10 Drawing Sheets

(51) Int. Cl.
G06F 3/0346 (2013.01)
H04W 12/02 (2009.01)

(56) References Cited

U.S. PATENT DOCUMENTS

2014/0240122 A1  8/2014  Roberts et al.
2016/0072690 A1  3/2016  Molettiere et al.
2017/0201611 A1  7/2017  Donley et al.

OTHER PUBLICATIONS

PCT International Search Report and Written Opinion for PCT International Application No. PCT/US2017/037330 dated Aug. 25, 2017 (14 pages).

FIG. 9C ously maintain data about one or more physical activities
TRACKING ACTIVITY DATA BETWEEN WEARABLE DEVICES PAIRED WITH A COMPANION DEVICE This application is a divisional of co-pending U.S. patent application Ser. No. 15/188,054 filed on Jun. 21, 2016.

BACKGROUND

The embodiments described herein relate to an accessory such as a watch or a fitness tracker or an audio accessory or a visual accessory for a companion device such as a smartphone or other type of data processing system.

A watch or other accessory can be configured to work with a data processing system such as a smartphone or tablet computer; for example, a watch can be paired, typically through Bluetooth wireless communication, with a companion device to provide health tracking functions and potentially other capabilities. For example, an Apple watch or a fitness device, can gather health data through one or more sensors, and then transmit this health data to the companion device which can be a data processing system such as a smartphone or tablet computer or laptop computer, etc. This health data can provide information that relates to a streak of a physical activity such as a streak of several consecutive days in which a user, who has worn the accessory, has moved (e.g. walked) more than a predetermined distance (e.g. over one mile) each day. Thus, the accessory can keep track of such a streak while the user wears the accessory over a period of time.

SUMMARY OF THE DESCRIPTION

In one embodiment, a set of wearable devices, each configured (e.g. through a Bluetooth pairing) to operate with one or more companion devices, are configured to cumulatively maintain data about one or more physical activities (e.g. a streak of consecutive work out days) even though a user may switch between wearing them over a period of time. For example, a streak of many consecutive days of workouts can be maintained while a user switches between a set of two or more watches or other wearable devices.

A method in one embodiment can include: collecting data about physical activity (e.g., standing or moving or working out, etc.) using one or more sensors on a wearable device while the wearable device is in a first worn state; storing a value (e.g., a streak's counter value) on the wearable device based on the collected data, wherein the value indicates an aspect (e.g. duration) of a physical activity event; transmitting the value to a companion device (e.g., a paired smartphone) to store the value on the companion device; ceasing collection of data about physical activity while the wearable device is in an unworn state; after the unworn state and while the wearable device is in a second worn state: resuming collection of data about physical activity using the one or more sensors and receiving a value from the companion device, the value from the companion device derived from data collected by another wearable device and indicating the aspect of the physical activity event; comparing the value on the wearable device to the value received from the companion device and determining a merged value based on the comparison; and storing the merged value as the value on the wearable device. In one embodiment, the value is a counter value (e.g. a value of the number of consecutive days of a physical activity event such as n consecutive days of standing for at least 60 minutes, etc.), and the counter value is incremented by the wearable device in the first worn state in response to the collection of data, wherein the incrementing indicates that the duration of the physical activity event has increased based upon data collected by the one or more sensors. In one embodiment, the method can also include: notifying a user of an achievement based on the duration exceeding an achievement goal. The method can also include, in one embodiment, removing duplicate notifications of an achievement, and notifying a user of the achievement based on the aspect exceeding an achievement goal, wherein the removal of duplicate notifications prevents a second notification of the achievement. In one embodiment, the counter value counts a streak of physical activity event (e.g. a streak of standing over 60 minutes each day) and the method can also include resetting the counter value to an initial value (e.g. zero) when the determining of the merged value indicates that the streak was broken. In one embodiment, the physical activity event has an associated type (e.g. streak type or best type or first seen type, etc.), and the determination of the merged value uses a merger strategy that is based on the associated type, and wherein the merger strategy is one of: largest value wins for streaks and best; smallest value wins for first seen values; or remote wins for streak resets. In one embodiment, the wearable device is a watch or an audio accessory or a visual accessory and the one or more sensors include one or more of: an accelerometer; a gyroscope, a heart rate sensor; a pulse rate sensor, etc. In one embodiment, the wearable device ceases the collection of data when it is not being worn (or is turned off/shut down), and the another wearable device may be worn when the wearable device is not being worn, and the wearable device resumes collection of data when it is worn again.

In one embodiment, a first wearable device includes: one or more sensors; a display; a memory; a radio transceiver configured to wirelessly communicate with a companion device; and a processing system coupled to the one or more sensors and to the display and to the memory and to the radio transceiver. The processing system is configured to receive through the radio transceiver during a second time period a first value from the companion device, the first value having been derived from data collected by a second wearable device during a first time period that precedes the second time period. The first value indicates an aspect (e.g., duration or streak) of a physical activity event that is defined by data collected by the one or more sensors and is compared to a second value stored in the memory. The processing system is configured to determine a merged value based on the comparison and is configured to store the merged value in the memory. In one embodiment, each of the first wearable device and the second wearable device is one of: a watch or an audio accessory (e.g. headphones or earbud, etc.) or a visual accessory (e.g. smart glasses) or a clothing or other wearable item, and the first wearable device and the second wearable device may be the same type of device (e.g. they are both watches) or they may be different types of devices (e.g., one may be a watch and the other is a wearable audio accessory or an optical head mounted display). In one embodiment, each of the first and the second wearable devices is configured to communicate with a companion device; for example, each may be paired through a Bluetooth pairing process with the companion device. In one embodiment, the methods and devices described herein can be performed with more than two wearable devices collecting data about physical activity, each of those wearable devices being configured to communicate with at least one companion device. In one embodiment, the one or more sensors comprises one or more: accelerometer; a gyroscope; a heart rate sensor; a pulse sensor; etc. In one embodiment, the set of wearable devices (e.g. first and second) cumulatively count the streak across both time periods to provide an accurate count of the streak even though neither is worn during the entirety of the streak.

In another embodiment, a method performed by a wearable device can include the following operations: receiving, at the wearable device in a first worn state, a first value from a companion device, wherein the first value indicates an aspect (e.g. duration of streak) of a physical activity event and the first value was derived from data collected by one or more sensors of another wearable device in a prior worn state occurring at a time different from and prior to the first worn state; comparing the first value to a second value stored on the wearable device; determining a merged value based on the comparison; and storing the merged value on the wearable device. In one embodiment, the merged value is a counter value which counts a duration of a streak, and the wearable device and the another wearable device cumulatively count the streak, with the assistance of the companion device, across both the prior worn state and the first worn state. In one embodiment, the method can also include incrementing the counter value on the wearable device in response to the collection of data, the incrementing indicating that the duration of the physical activity event has increased (e.g., the streak of consecutive days of exercising at least 30 minutes each day has been extended to 4 days). In one embodiment, the method can also include notifying a user of an achievement based on the duration exceeding an achievement goal and can also include removing duplicate notifications of an achievement wherein the removal of duplicate notifications prevents a second notification of the same achievement. In one embodiment, the method can also include resetting the counter value to an initial value (e.g. zero) when the determining of the merged value indicates a streak was broken.

The methods and systems described herein can be implemented by data processing systems, such as one or more watches, audio accessories, visual accessories and other wearable devices operating in conjunction with a set of one or more companion devices. The methods and systems described herein can also be implemented one or more data processing systems which execute executable computer program instructions, stored on one or more non-transitory machine readable media that cause the one or more data processing systems to perform the one or more methods described herein. Thus, the embodiments described herein include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 9C is a diagram that shows a companion device correcting a streak based on stored data on the companion device.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein relate to systems and methods for switching between wearable accessories of a companion device, where the accessories can be, for example, watches that have been paired with the companion device to allow for wireless communication such as wireless communication through Bluetooth between each of the watches and the companion device. It will be appreciated that the accessories may be watches or other devices, such as GPS trackers, fitness trackers, wearable audio accessories (such as a headphone or earbuds), wearable visual accessory (such as a head mounted display), wearable jewelry or belt or bracelet or clothing, and other accessories that can operate with a companion device. Thus, even though the following description focuses on watches, the embodiments can include other types of devices or wearable accessories.

Figure 1:
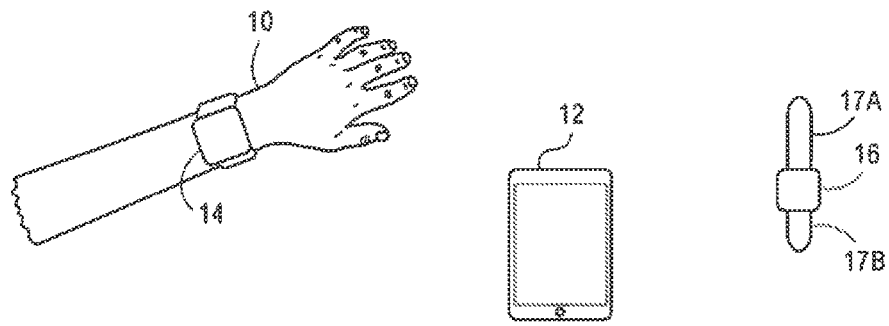
FIG. 1 shows an example of a set of devices which includes a companion device (e.g., a smartphone) and two paired watches, one or which is active (collecting data about physical activity) and the other which is inactive (and not collecting data about physical activity).

FIG. 1 shows a companion device 12 which can be paired with a plurality of accessories, such as the watches 14 and 16. The pairing process can be a conventional Bluetooth pairing operation as is known in the art. The companion device 12 can be a smartphone or a tablet computer or a laptop computer or other consumer electronic device that can be paired with the multiple accessories. As shown in FIG. 1, the watch 14 is being worn by the user and is currently on the user's wrist 10. The watch 16 and the companion device 12 can be both near the user. For example, the companion device 12 can be in the user's shirt pocket or next to the user. Similarly, the watch 16, which includes straps 17A and 17B to attach to the user's wrist, can be adjacent to the user. The proximity of the devices allows the Bluetooth radio systems which are used in one embodiment to communicate as all three devices are within Bluetooth range of each other. In one embodiment, the user can have the companion device 12 in a pocket or briefcase or purse or on a desk while the user removes the watch 14 and places the watch 16 on the wrist 10. As is described further below, the watches 14 and 16 can be transmitting signals that indicate on-wrist confidence levels to the companion device which can then automatically decide that the watches have been switched (based on the signals indicating on-wrist confidence levels) so that the watch 16 should now be made the active watch and the watch 14, which was the active watch while it was on-wrist, will now be made the inactive watch. Further information about methods for automatic switching between wearable devices is provided in U.S. Provisional Patent Application No. 62/276,923, filed Jan. 10, 2016, which is incorporated herein by reference. In other embodiments, the wearable accessories can be manually switched. Before describing further details about the various embodiments discussed herein, an overview of the hardware of an accessory, such as a watch, will be provided in conjunction with FIG. 2.

Figure 2:
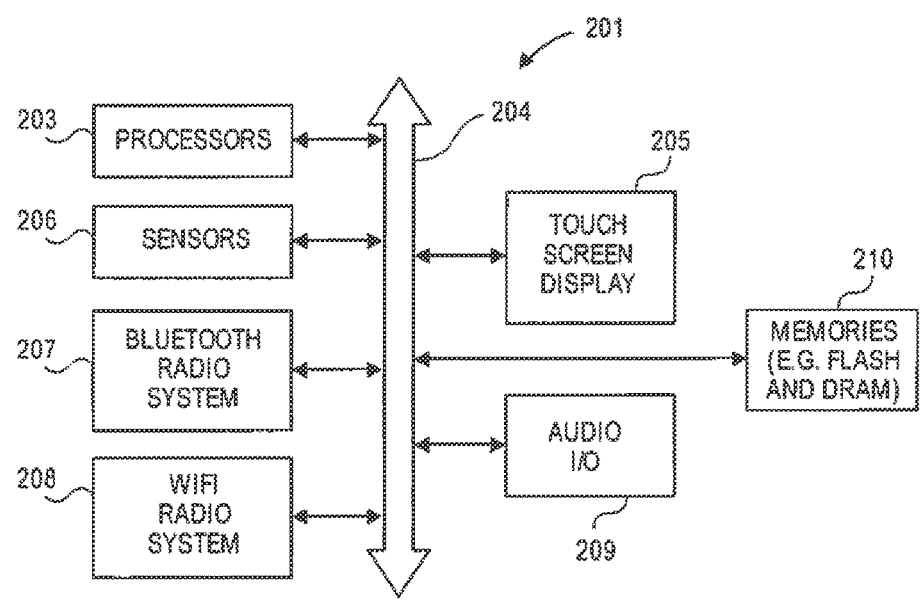
FIG. 2 is a block diagram showing an example of a wearable accessory (e.g. a watch) for a companion device.

The watch 201 in FIG. 2 can include one or more processors 203 which are coupled through one or more buses 204 as is known in the art to the rest of the components of the watch. Those additional components can include one or more sensors 206, a touch screen display 205 which both displays images to the user and also can receive touch inputs on the screen of the display as is known in the art. In addition, the watch 201 can include a Bluetooth radio system 207 and a WiFi radio system 208. The watch 201 also includes one or more memories 210 which can include flash memory, DRAM memory and ROM memory as is known in the art. These memories can store data, such as wrist states and can also store executable computer program instructions which can cause the watch to operate as described herein. In addition, the watch 201 can include audio input/output 209 such as a microphone and one or more speakers 209. The sensors 206 can include one or more accelerometers or motion detectors or orientation detectors or gyroscopes or other sensors which can sense physical activity such as standing or moving or exercising, etc. The sensors 206 can also include sensors that sense a proximity to a wrist or sense reflections from a wrist, such as LED based sensors that generate LED light and then sense reflected LED light that has been reflected by the wrist's skin. The sensors can also include one or more of: heart rate sensors, perspiration sensors or other sensors of a user's biological state. These sensors can be used as described herein to determine the on-wrist state or on-wrist confidence level which then can be transmitted to a companion device, such as the companion device 12 shown in FIG. 1. The sensors can be also used to sense physical activity of the user. It will be appreciated that other types of sensors can also (or alternatively) be used such as a sensor in a buckle to detect removal of a watch; see for example published PCT Application PCT/US2014/014151 (International Publication No. WO 2015/116163). The watch 201 can represent the hardware and software architecture of watches 14 and 16 in FIG. 1 or watches 251 and 253 shown in FIG. 3.

Figure 3:
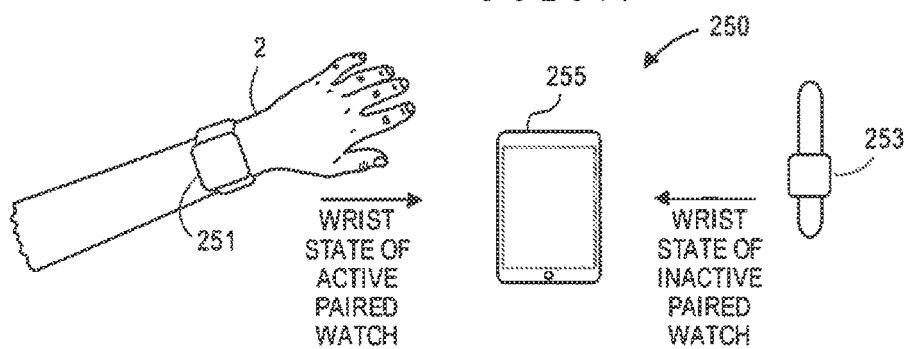
FIG. 3 shows a set of paired watches which communicate with a companion device to allow the companion device to perform a switch between the watches and to allow the watches to cumulatively record physical activity even across switches between the watches.

Referring now to FIG. 3, a set of devices 250 can include a companion device 255, a watch 251, and a watch 253. The watch 251 is the currently active paired watch while the watch 253 is the inactive paired watch. The active paired watch is shown on the user's wrist 2 while the inactive paired watch may be in the user's purse or pocket or on a table next to the user. A companion device 255 may be in the user's pocket or purse or briefcase or near the user on a table which is near the user. In the example shown in FIG. 3, the watches 251 and 253 are within radio range for the Bluetooth systems that are contained within each of the watches 251 and 253 and also within the companion device 255. In one embodiment, the companion device 255 can be a smartphone or tablet computer or laptop computer or other consumer electronic device. While the watch 251 is within Bluetooth radio range of companion device 255, the watch 251 can repeatedly transmit one or more wrist state values indicating an on-wrist confidence level of the watch 251. These transmissions can occur using an encrypted communication protocol which operates on top of the Bluetooth communication system and utilizes the Bluetooth communication system. While the watch 253 is within Bluetooth radio range of the companion 255, one or more wrist state values can be transmitted by the watch 253. In one embodiment, these transmissions can occur through Bluetooth advertisements which can include an advertising identifier as well as the wrist state value determined by the watch 253 based upon data from the one or more sensors in watch 253, such as one or more sensors 206.

In one embodiment, the wrist state can have four possible values shown as zero, low, medium, and high. Zero represents a state in which the sensors provide outputs from which the watch determines that it is not on the user's wrist. The low value indicates a low on-wrist confidence level. The medium value indicates a medium on-wrist confidence level, and the high value indicates a high on-wrist confidence vale. In one embodiment, a combination of data from different sensors can be used to derive the on-wrist confidence level. In one embodiment, data from an accelerometer may indicate the raising or lowering of a wrist and data from sensors to detect reflected or absorbed light from the user's skin (or other body part) on the user's wrist can be combined together to derive the different wrist states such as the four wrist states. It will be appreciated that other types of sensors may also be used either alone or in combination. For example, a clasp detector (e.g. a detector on the watch's buckle) or detectors used to detect a pulse or heart rate can also be used.

The wrist state value can be computed in a variety of different ways based upon one or more outputs from one or more sensors such as sensors 206 in FIG. 2. In one embodiment that uses one or more sensors (e.g. an accelerometer) to detect the raising and lowering of the wrist and also uses one or more sensors to detect radiation reflected off of (or absorbed by) the wrist, such as the wrist's skin (which can be referred to as a wrist detection by a wrist detector sensor), the wrist state value can be derived as follows. This approach uses a combination of sensors that repeatedly over time produce outputs and these outputs are used to determine the wrist state value. When the accelerometer detects the raising or lowering of the wrist after the wrist detector senses the wrist's skin (or other body part such as blood) then the wrist state value is set to high. When the wrist detector senses the wrist's skin (or other part) but the accelerometer has not detected a wrist raised or lowered in a period of time (for example, the last 6 seconds), then the wrist state value is set to medium. When the accelerometer detects a wrist raise or lowering which occurred in the last period of time, such as the last 6 seconds, but the wrist detector does not sense the skin (or other body part) of the wrist, then the wrist state value is set to low. The value of zero for the wrist state is set if the accelerometer does not detect a wrist raise or lower in the last period of time, such as the last 6 seconds and the wrist detector does not sense the wrist's skin (or other body part). These wrist values can be repeatedly determined over time and will most likely change if the user removes one on-wrist watch and replaces it with another. In one embodiment, an additional wrist state value may be provided based upon a detected touch of the watch's touch screen or other detected user interaction with the watch. If this detection (e.g. of a finger on the touch screen) occurs in combination with the detections that produced the high wrist state value then the system can produce this additional wrist state value which can be characterized as extra high. It will also be appreciated that in other embodiments, "gestures" or wrist movements other than raising or lowering can be used such as shaking or twisting of the wrist, etc.

In one embodiment, the companion device, such as companion device 255 can repeatedly over time scan for wrist state values from at least inactive paired watches, in addition to receiving wrist state values from the active paired watch. In one embodiment, the companion device may not always scan for watches; for example, in one embodiment, if the wrist state value for the active watch is continually high indicating the watch has a high on-wrist confidence level, the companion device may not scan for other watches. In particular, the companion device can be configured to scan when the active watch is connected as the active watch with the medium or lower confidence level, but if the active watch is connected with higher than a medium confidence level then the companion device may be configured to not scan for multiple watches. This can help to conserve battery power on the companion device if the companion device is powered by a battery.

Once a companion device determines that a switch between wearable accessories has occurred, the companion device can attempt to perform a "last chance" synchronization with the wearable accessory that has just been removed and also perform a synchronization with the wearable accessory ("new wearable accessory") that has just been attached to (or otherwise worn by) the user. This synchronization process can allow for the "new" wearable accessory to obtain up to date information about health and fitness from the companion device in one embodiment. Switching between wearable accessories can however pose problems for measuring or counting physical activity, such as a streak of several consecutive days of exercising more than a desired goal, when a portion of the streak is performed on a first wearable device or accessory and another portion is performed on another wearable device or accessory. The embodiments described herein provide methods and system for maintaining data about one or more physical activity events that span a time period in which one or more switches, between a set of wearable devices, occurred. In one embodiment, the set of wearable devices and the companion device (or set of companion devices) are configured to cumulatively and cooperatively maintain such data through a synchronization process that merges data based upon the types of data or merger strategies.

Figure 4:
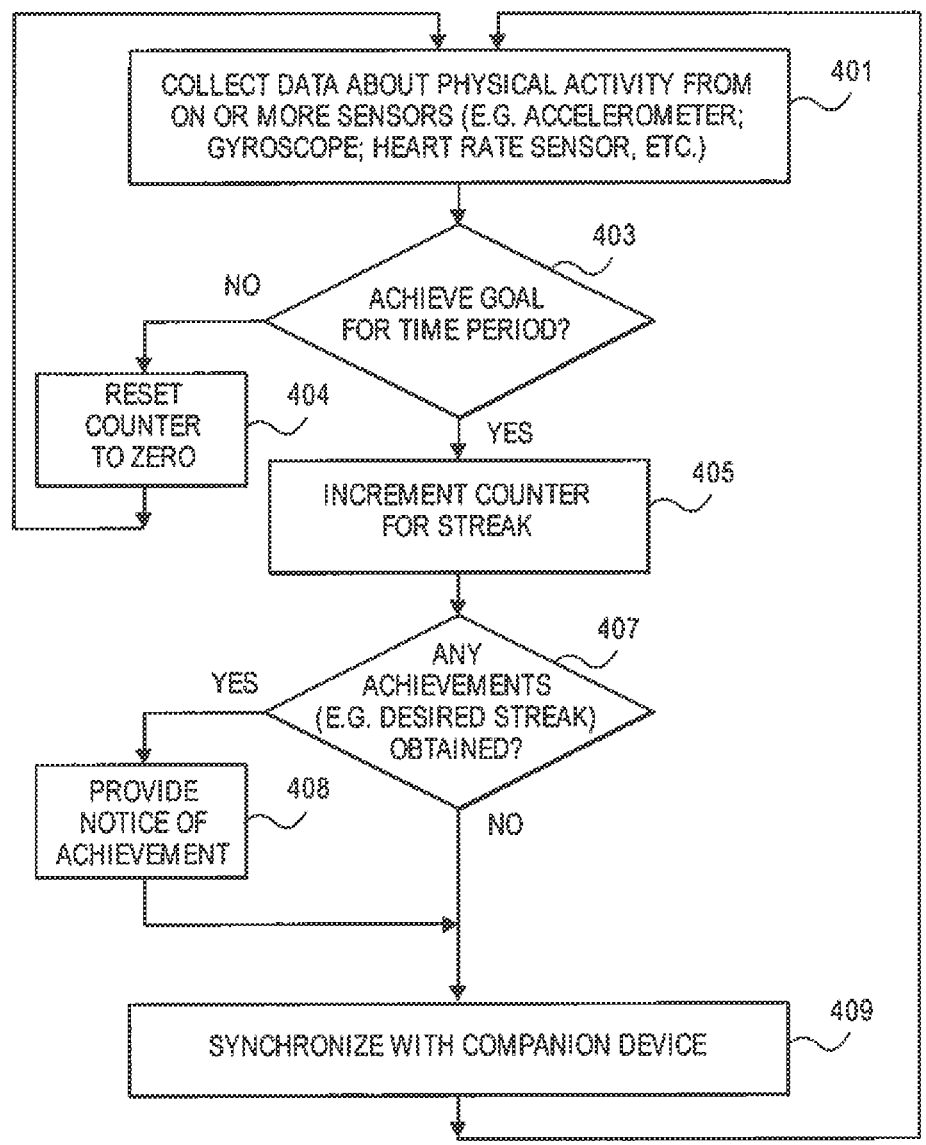
FIG. 4 is a flowchart which shows a method, in one embodiment, for collecting data for a streak of a physical activity event.

FIG. 4 shows an example of a method in one embodiment which can be used by a wearable device while it is worn to collect data about physical activity and keep track of one or more streaks relating to the physical activity. In one embodiment, the wearable device when it is worn by the user is typically the active wearable device in a set of wearable devices such as a set of smart watches. An example of a smart watch is the Apple Watch from Apple Inc. of Cupertino, Calif. That watch can keep track of physical activities, such as standing or moving or exercising or calories burned in a day, etc. Moreover, that watch can provide notifications of achievements reached relative to one or more goals set for each category or type of physical activity events. The physical activity is tracked by collecting data about the physical activity from one or more sensors in operation 401 of FIG. 4. The one or more sensors can include one or more accelerometers, one or more gyroscopes, one or more heart rate sensors, and potentially other sensors which are configured to collect data about movement and biological parameters which are indicative of physical activity, such as standing moving, exercising, etc. The process of collecting such data and analyzing such data to derive information about such physical activity is known in the art. The collective data is analyzed and processed in order to determine whether or not specific goals have been achieved in operation 403. Each physical activity event may have its own goal, and thus operation 403 is performed for each physical activity event separately. For example, when the physical activity event is standing for at least a predetermined number of minutes each day, operation 403 would evaluate the data from the sensors to determine whether or not for a given day the user stood for at least the predetermined minutes. If the goal was not achieved then operation 404 would follow in which the counter for the corresponding streak is reset to zero and processing returns to operation 401 to continue collecting data. On the other hand, if the goal was achieved for a particular time period such as one day, then operation 405 follows operation 403. In operation 405, the counter for the particular streak is incremented. For example, if the prior value for a standing streak is three days and the standing goal was achieved in the current day, then operation 405 would increment the counter from three days to four days and store the incremented value of four days as the streak value for the standing activity event. The wearable device can then in operation 407 determine whether any achievements have been obtained such as an achievement of standing for 10 consecutive days for more than a predetermined number of minutes for each day. Operation 407 can also be performed for each of the different physical activity events, including for example a standing goal, a move goal, an exercise goal, a goal with respect to calories burnt each day, etc. If operation 407 determines that an achievement was obtained, then operation 408 occurs in which the wearable device can provide a notice to the user of the achievement. In one embodiment, the wearable device itself provides the notice to the user while in another embodiment the companion device can provide the notice, and in yet another embodiment, both the wearable device and the companion device can provide the notice of the achievement to the user. At some point during the method shown in FIG. 4, the wearable device can synchronize with the companion device in order to provide information about health and fitness including the achievements obtained and information about the data collected about physical activities, etc. The synchronization can be performed in operation 409 which can follow operation 407. It will be appreciated that the order of the operations shown in FIG. 4 is a sequence performed in one embodiment and that in alternative embodiments, the order may be varied to perform the operations in a different sequence. In one embodiment, the method shown in FIG. 4 is performed when the wearable device is being worn and is considered an active device relative to the companion device. Moreover, the wearable device will cease performing the operations shown in FIG. 4 when it is not worn in one embodiment. For example, when the wearable device is not worn, it will not collect data about physical activity or attempt to determine whether goals have been achieved or whether any achievements have been obtained and will not synchronize with the companion device. In this embodiment, when the wearable device is not worn, it can be in a sleep state or a shut down state.

Figure 5A:
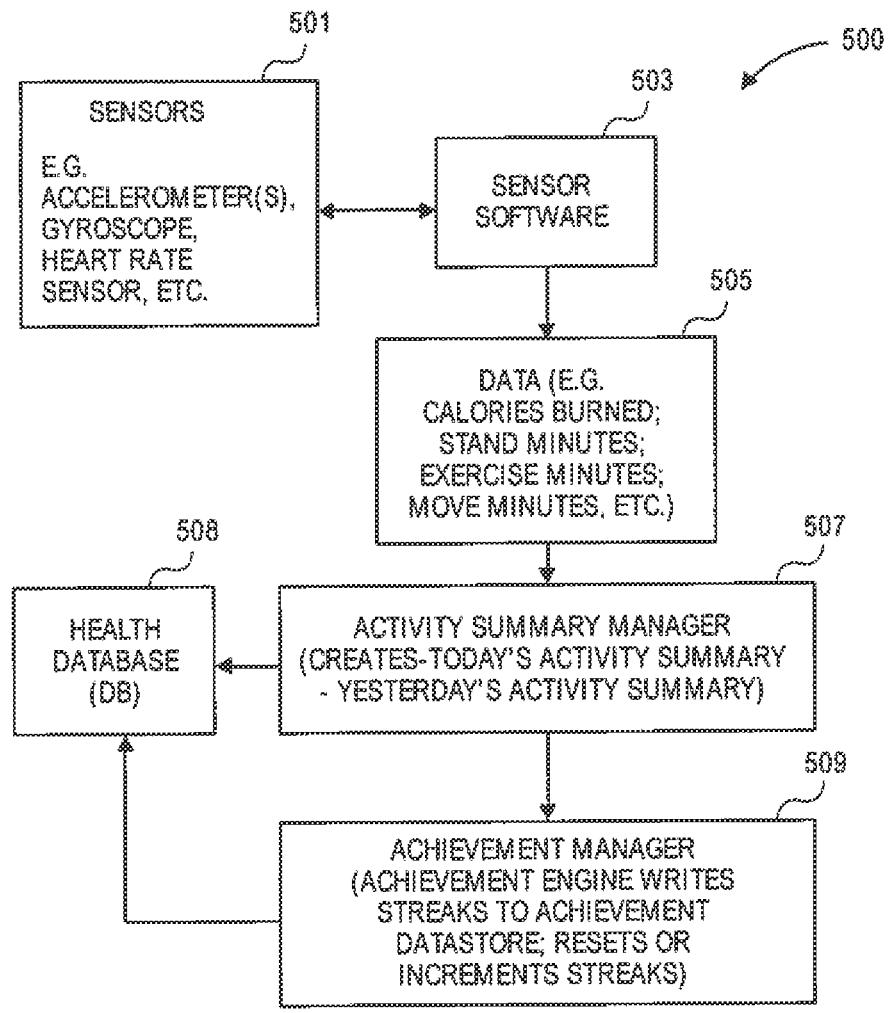
FIG. 5A is a block diagram of components of a wearable device that collects and processes data for one or more physical activity events.
Figure 5B:
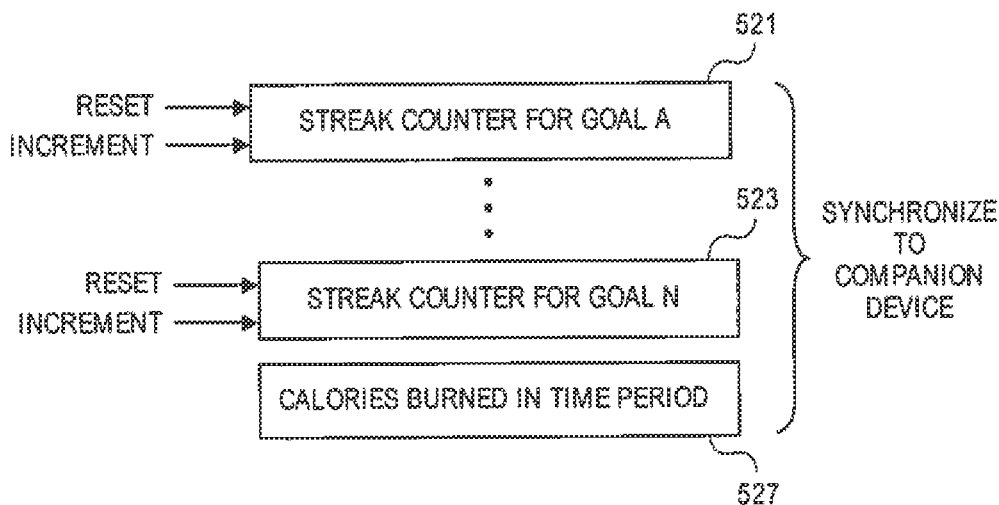
FIG. 5B shows an example of memories for storing values relating to physical activities such as streaks of such physical activities.

FIG. 5A shows an example of components or modules within a wearable device which can perform the method shown in FIG. 4 as well as the methods shown in FIGS. 6A and 6B and FIGS. 9A-9C. The wearable device 500 can include a set of sensors 501 such as a set of accelerometers, gyroscopes, heart rate sensors, etc. The sensors 501 can be similar to the sensors 206 shown in FIG. 2. Data output from these sensors can be provided in one embodiment to sensor software 503 or sensor processing logic which can process the data output from sensors 501 to create the data 505 which is data relating to physical activity events, such as minutes that the user has stood or exercised or moved during the period of time as well as calories burned during a period of time. In one embodiment, the sensor software 503 can be configured to periodically sample sensors 501 and generate data based on the output from the sensors every X minutes, where X can be, for example, 15 minutes. The data 505 can then be provided to the activity summary manager 507 which combines the new samples of data 505 with the cumulative samples (previously obtained from the sensor software 503) in order to create a daily summary such as a summary for today's activity and a summary for yesterday's activity. In one embodiment, the activity summary manager 507 may be implemented by one or more software components or one or more hardware processing logic components configured by the software. The activity summary manager 507 causes the storage of the activity summaries in the health database 508. In one embodiment, the health database 508 can include counters for storing streaks, such as the streak counters shown in FIG. 5B. Data from the activity summary manager 507 can be provided in one embodiment to the achievement manager 509. In one embodiment, when the values in the different activity summaries created by the activity summary manager 507 change, then the achievement manager 507 can run to determine whether or not modifications should be made to streaks, such as counter values in streak counters or whether streaks need to be reset or incremented. In one embodiment, the achievement manager 509 can perform operations 403, 405, 404, and 407 and 408 shown in FIG. 4. The achievement manager 509 in one embodiment can update the streaks by either resetting or incrementing the streak values in each streak counter. FIG. 5B shows examples of several streak counters for various goals, each which can be reset or incremented depending on data about physical activity provided by sensors, such as sensors 501. In particular, the set of streak counters can include a streak counter 521 and a streak counter 523 which can each be separately reset or incremented depending on the operations performed in, for example, the method shown in FIG. 4. The streak counters can be stored in the health database 508 along with data for calories burned, such as counter 527 which can count the calories burned over the day or other time period. In one embodiment, data from the health database, including the counter values in the streak counters and other health values, including calories burned in a time period are synchronized for the companion device; for example, the counter values in the streak counters 521 and 523 as well as the counter value in memory 527 can be synchronized in operation 409 by transmitting these values to the companion device during a synchronization operation.

Methods performed by a wearable device, such as a watch, to properly maintain streak data (and other data relating to physical events) across switches between wearable devices will now be described with reference to FIGS. 6A and 6B. These wearable devices assumed to have performed a method shown in FIG. 4 in one embodiment and can use the components shown in FIGS. 5A and 5B to perform the method of FIG. 4. The method shown in FIG. 6A focuses on what happens when a "new" watch is worn, and it may be that the watch is in fact new and not previously worn or it may have been previously worn but has not been worn recently. The method shown in FIG. 6B shows a process performed by a wearable device both before and after a switch for that wearable device.

Figure 6A:
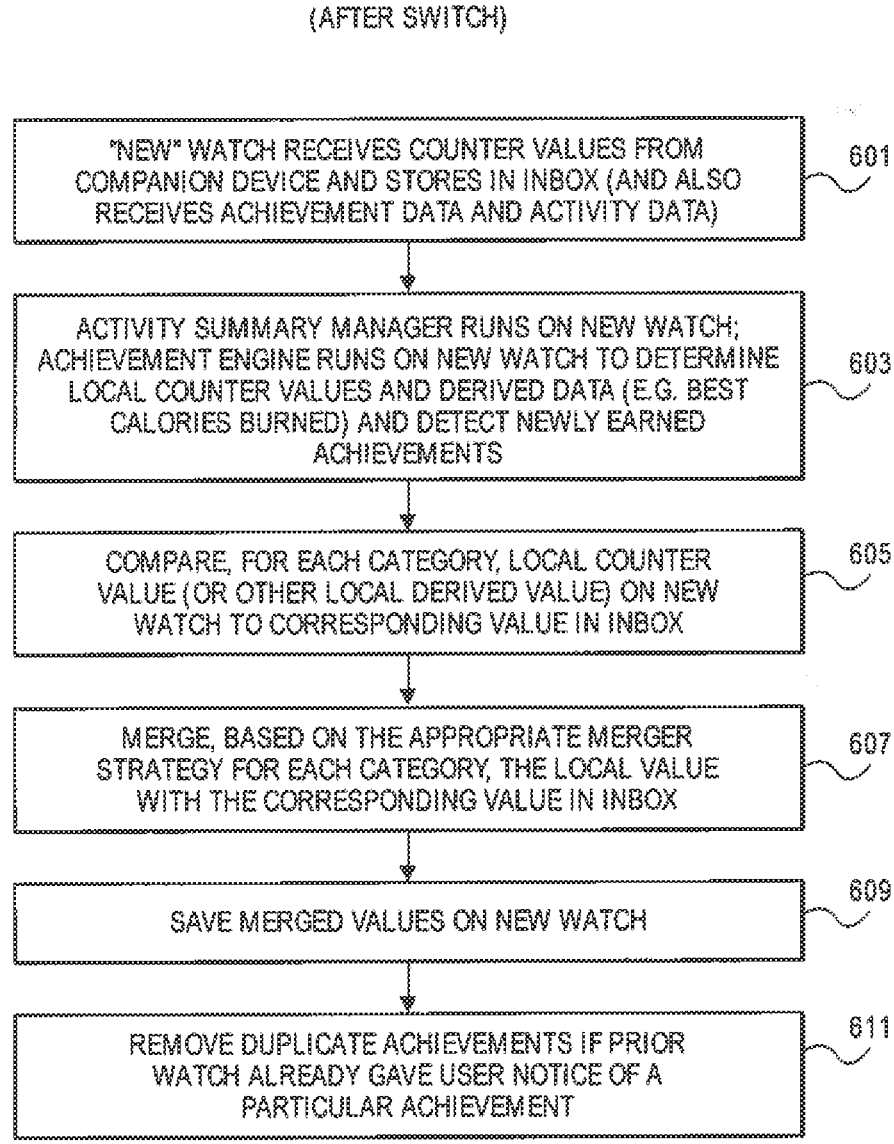
FIG. 6A shows a flowchart that illustrates a method, in one embodiment, for managing data about physical activity events across switches between wearable accessories such as a switch between two watches.

The method shown in FIG. 6A can begin in operation 601 in which a "new" watch receives counter values from a companion device, such as a smartphone and stores the counter values in an "inbox" and also receives achievement data and activity data from the companion device in one embodiment. Then in operation 603, an activity summary manager can run on the new watch to process the activity data locally obtained on the watch. In addition, an achievement engine on the watch can run to determine local counter values and derive data such as best calories burned to determine whether there are newly earned achievements. Operation 603 can be performed in one embodiment in order to create local data on the watch prior to performing any comparisons or mergers in operations 605 and 607 respectively. For example, a watch performing the method of FIG. 6A may be worn for a considerable time period before receiving values from a companion device 601; thus there may be physical activity which has occurred prior to receiving values from the companion device in operation 601 and thus local values of the watch need to be updated, in one embodiment, by the activity summary manager and the achievement engine prior to performing the comparison operation 605 or the merger operation 607. In operation 605, the wearable device compares, from each category, the local counter value or other local derived value on the watch to the corresponding value in the inbox. The values stored in the inbox were received from the companion device in operation 601 and are compared, for each category, to a local counter value or other local derived value created in operation 605. The result of the comparison for each category will determine a merged value in operation 607 which is based upon the appropriate merger strategy for each category. In particular, operation 607 merges the local value with the corresponding value in the inbox to create a merged value which is saved in operation 609. For example, if the local value for a standing streak is zero and corresponding value in the inbox for the standing streak is three, the value of three will be saved as the merged value for the standing streak because the merger strategy for a streak, which is a type of event, is: the largest value in the comparison "wins" and is selected as the merged value. If on the other hand it appears that the streak was broken because the corresponding value in the inbox indicates that the streak was reset then, the merger strategy is that the remote wins which in this case is the value from the companion device which was transmitted in operation 601 thereby causing the streak to be reset to zero in one embodiment. The merged values which are saved in operation 609 become the various new counter values for the various streaks and other physical activity events on the wearable device and those merged values will continue to be processed in one embodiment according to the method shown in FIG. 4 and using the components shown in FIG. 5A to continue the process of maintaining the health data, including the streaks and achievements on the wearable device. The method shown in FIG. 6A can be repeated each time the wearable device performs a synchronization with the companion device while it remains the active watch.

The method shown in FIG. 6A can also include an optional operation 611 which can remove duplicate achievements if a prior watch (or the companion device in one embodiment) has already given the user a notice of a particular achievement. Further details with respect to the removal of duplicate achievements will be provided further below.

Figure 6B:
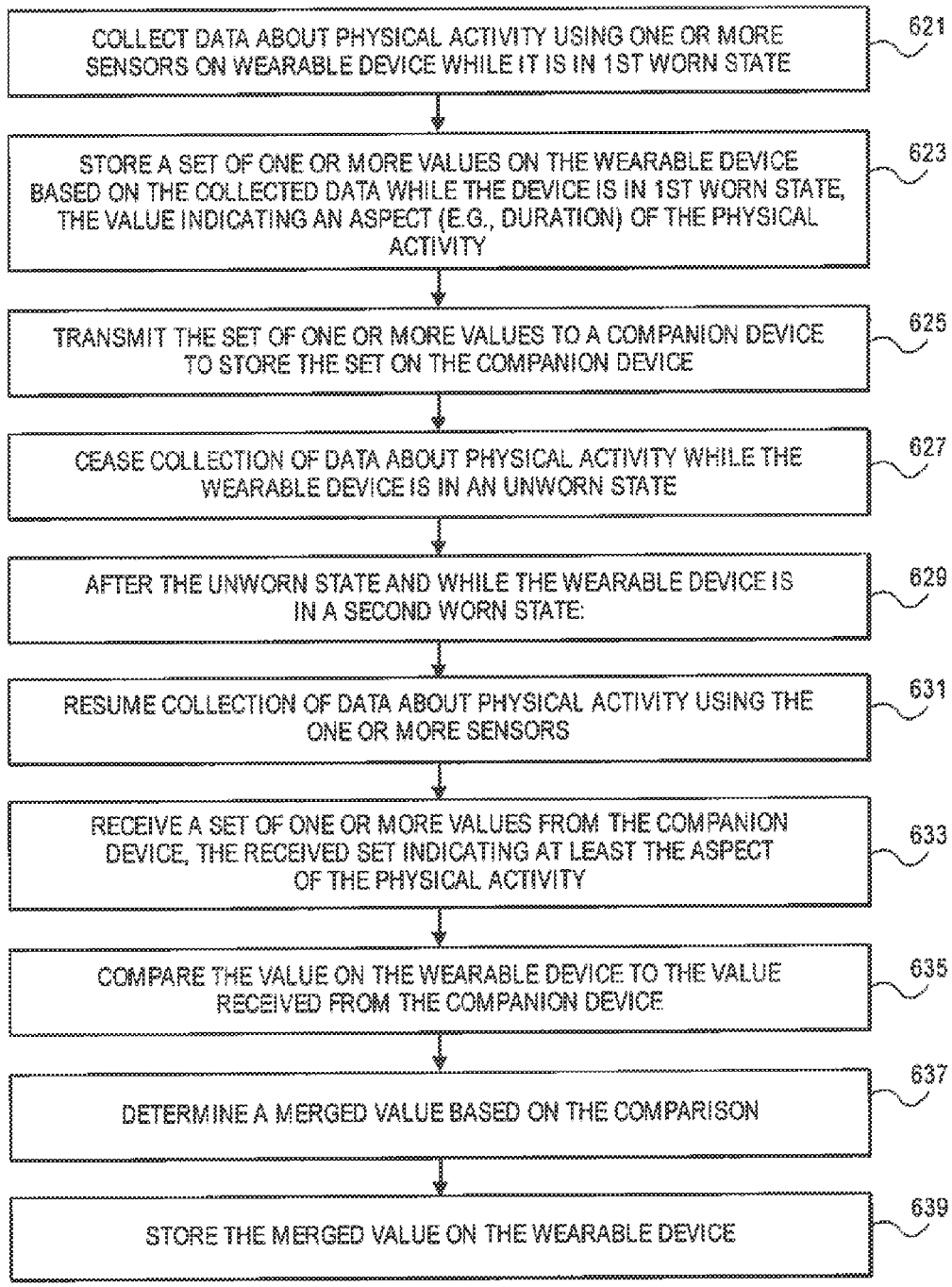
FIG. 6B is a flowchart that depicts a method, in one embodiment, performed by a wearable device before and after a switch between wearable devices while continuing to maintain data about physical activity events across the switch.
Figures 7, 8:
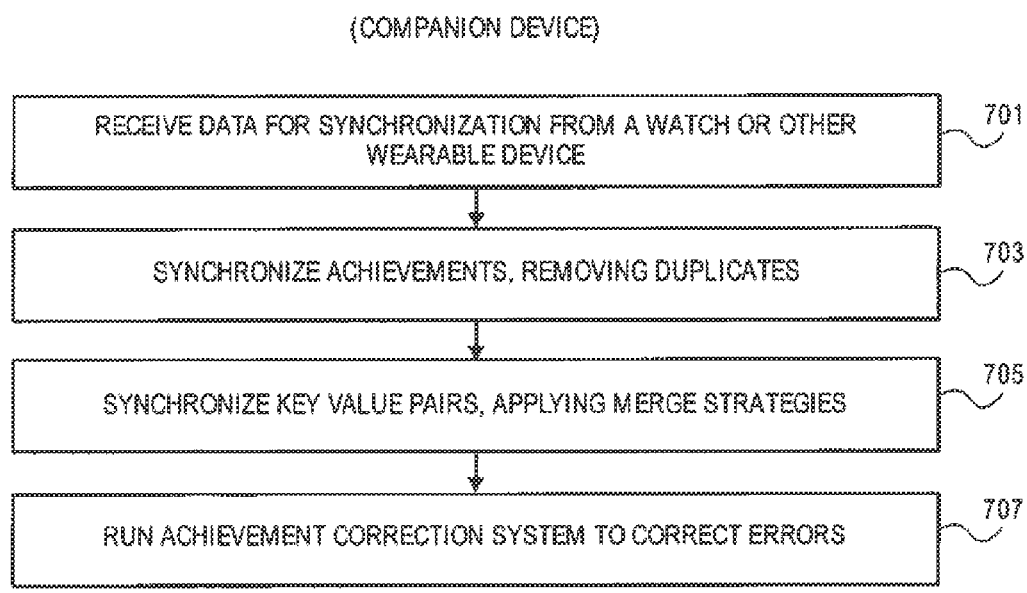
FIG. 7 is a flowchart that shows a method, in one embodiment, performed by a companion device that supports cumulative tracking of streaks, etc. of physical activities across switches between wearable devices.
FIG. 8 is a table which shows examples of merger strategies for deciding how to merge two values to yield a final merged value that represents the streak or other aspect of a physical activity event being counted by a set of wearable devices working in conjunction with a companion device.

A method performed by a particular watch before and after a switch between watches is shown in FIG. 6B. This method can begin in operation 621 in which the wearable device, such as a watch, collects data about physical activity using one or more sensors on the wearable device while it is in a first worn state. Then in operation 623, the wearable device stores a set of one or more values on the wearable device based on the data which was collected in operation 621. The one or more values can indicate an aspect, such as a duration of a streak, of the physical activity. In one embodiment, operation 621 and 623 can be repeated over time; for example operations 621 and 623 can be repeated every 15 minutes to obtain and store the data from the sensors and to derive the set of one or more values based upon that data. In one embodiment, current samples collected every 15 minutes are added to cumulative samples to determine, for example, how many calories have been burned so far in a particular day or how many minutes of standing have been performed by the user in a particular day or how many minutes of exercise or moving have been performed in a particular day, etc. In operation 625 the wearable device can transmit the set of one or more values to a companion device to store the set on the companion device. In one embodiment, the transmission operation 625 can be performed repeatedly over time whenever the companion device is in radio range (e.g., Bluetooth radio range) of the wearable device. The transmission operation 625 can be part of a synchronization operation which can be performed repeatedly over time between the wearable device and the companion device. It will be appreciated that in one embodiment operation 623 can use the activity summary manager 507 and the achievement manager 509 to update today's activity summary and the yesterday's activity summary as well as to update achievements such as achievements of streaks and other information which is stored in a health database, such as health database 508. Returning back to FIG. 6B, in operation 627, the wearable device ceases collection of data about physical activity while the wearable device is in an unworn state. In one embodiment, a switch has occurred and the user has taken the wearable device off and is using another wearable device which can also be collecting health data from one or more sensors and performing the operations shown in FIG. 4 and use similar components such as the components shown in FIG. 5A. In one embodiment, the wearable device which performed operations 621 through 625 can be in a shutdown state or a sleep state while it is not worn by the user. The other wearable device which may be worn by the user can continue to collect data about physical activity such as standing streaks or moving streaks, etc. so that the streaks may be maintained after the switch and after the wearable device is worn again which occurs in operation 631 in which the wearable device now resumes collection of data about physical activity using the one or more sensors because it has become worn again and is now in a second worn state. This is indicated by block 629 which indicates that operations 631 through 639 are performed after the unworn state and while the wearable device is in a second worn state. Operation 631 can be similar to operation 621 and the components shown in FIG. 5A can be used to collect the data and to process the data to determine values for the one or more streaks and other physical activity events based upon the collected data. In operation 633, the wearable device receives a set of one or more values from the companion device, where the received set includes data relating to a set of physical activity events, such as the streaks tracked by the other wearable device which generated the values and then provided them to the companion device which later transmitted those values to the wearable device so that they could be received in operation 633. Then in operation 635, the value for a particular physical activity event on the wearable device is compared to the value for the corresponding physical activity event received from the companion device. In one embodiment, prior to performing the comparison in operation 635, the wearable device can perform an operation similar to operation 603 in order to calculate or derive a current local value on the wearable device. Then in operation 637, the wearable device can then determine a merged value for each physical activity event based upon the comparison. Operation 637 can be similar to operation 607 shown in FIG. 6A and can use a merger strategy for each type of event in order to determine the appropriate merged value for the event. FIG. 8 shows an example of a set of merger strategies for different types of events such as streaks or bests or streak resets, etc. After each merged value for a particular physical activity event or type of event is determined in operation 637, it can be saved or stored as the merged value on the wearable device in operation 639. The storing of the merged value creates the current counter value or other value for the physical activity event which is then used in further processing on the wearable device such as the processing operations shown in the method of FIG. 4. For example, the merged value stored in operation 639 is used in future processing using, in one embodiment, the method of FIG. 4 in the wearable device which can increment the streak or reset the streak depending upon the collected data from the one or more sensors on the wearable device. In one embodiment, the method shown in FIG. 6B can also include an optional operation similar to operation 611 which removes duplicate achievements if the prior or other wearable device already gave the user a notice of a particular achievement. Further details with respect to the removal of duplicate achievements will be provided below.

FIG. 7 shows a method which can be performed by the companion device which in the embodiments described herein act as an intermediary between the set of wearable devices which were switched over time so that streaks can be continued to be tracked or maintained over time even though the wearable devices are switched over that time. The companion device acts as an intermediary in that it stores data received from the wearable devices and can use that data to synchronize the future wearable device when a switch occurs. In operation 701, the companion device receives data for synchronization from a watch or other wearable device. A receipt of this data is a result of a transmission from the wearable device, such as operation 625. After receiving the data from operation 701, the companion device can then synchronize achievements in operation 703 and can optionally remove duplicates such as duplicate achievements. The removal of duplicate achievements will be described further below. In operation 705, a companion device then synchronizes key value pairs by determining merged values for each key, where determination of the merged value uses merger strategies, such as the merger strategy shown in FIG. 8. Then the companion device can perform optional operation 707 in which an achievement correction system is run to correct errors. The achievement correction system relies upon, in one embodiment, a collection of all data from all wearable devices which are configured to collect data for a set of physical activity events. Further information with respect to an achievement correction system will be provided below in conjunction with FIG. 9C.

FIG. 8 shows an example of merger strategies according to one embodiment. A merger strategy specifies how to select values for a particular category or type of event. For example a streak (such as a streak of consecutive standing days or consecutive exercise days) is one type of event and the merger strategy for that type of event is to select the largest value in the comparison to become the merged value. Similarly, the number of calories burned in a day is a "bests" type of event and the merger strategy for that type is again to select the largest value in the set of values. For example, if one watch indicates the calories burned are 400 and another indicates the calories burned in a particular day are 500 then the larger value of 500 is selected as the merged value. Streak resets are another type of event and the merger strategy in that case is to allow the remote device which transmitted the synchronization data to win to cause the reset to occur. In one embodiment, the reset is stored in an activity summary with a number representing a date and merger strategy is configured to look for the most recent date for a reset. Each reset in one embodiment is specific to a particular goal and an example for how a set of watches can be reset is provided below in conjunction with FIG. 9B. A type of event known as a first-seen value has a merger strategy of the smallest wins meaning that the smallest value is selected when merging two values to create the merged value. For example, a first workout date or first running date is an example of a first-seen value, and a watch comparing such values will select the smallest date. In one embodiment, every activity summary is for a particular day/date in universal coordinated time, and this date is turned into a number; thus, smaller numbers are earlier in time.

Figure 9A:
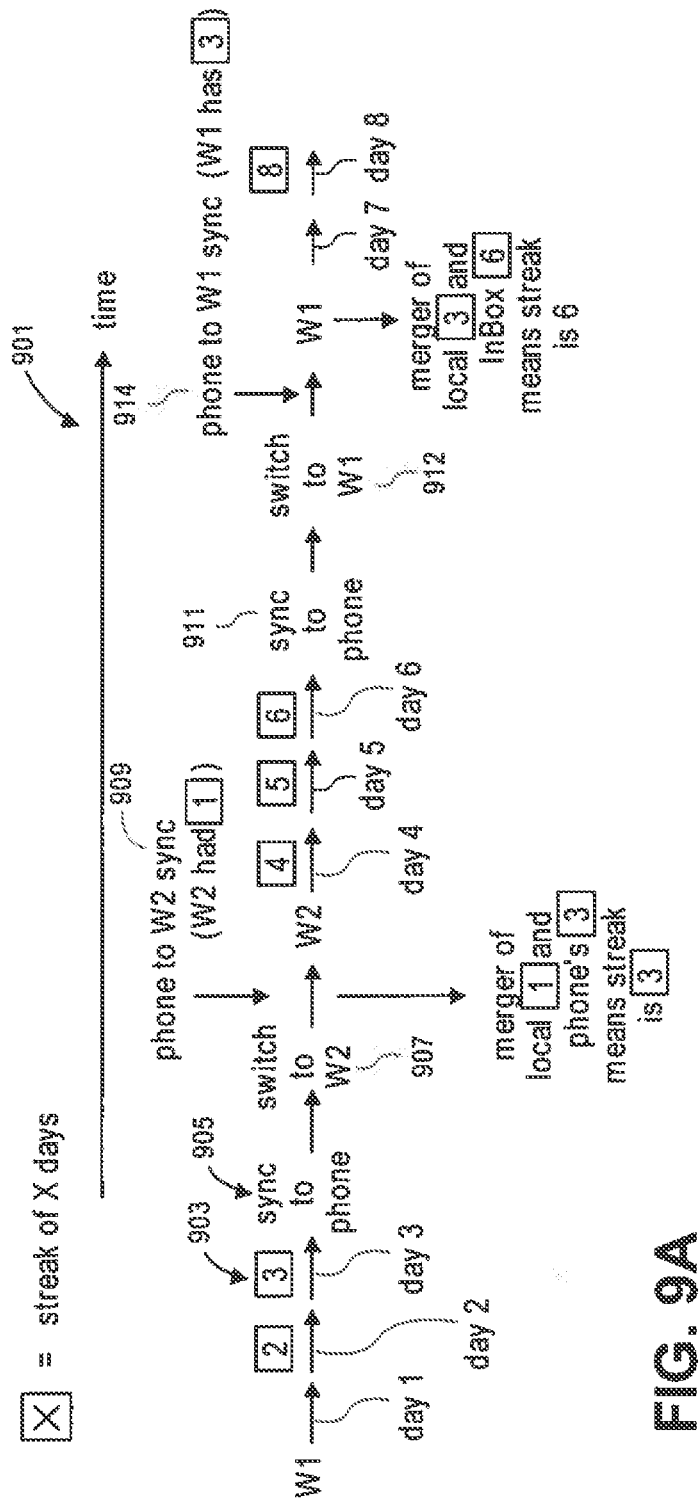
FIG. 9A is a diagram that shows, according to one embodiment, how two switches between watches is managed with the watches and the companion device to cumulatively count a streak across the entire time from the beginning of streak.

FIG. 9A shows an example of a companion device, in this case a smartphone, configured to work with two watches, W1 and W2, over a period of time shown by timeline 901. The sequence begins with the user wearing watch 1 (W1) on day 1. The watch collects data as the user wears it, and the watch determines that the user has succeeded in achieving a goal, such as a standing goal or a move goal or an exercise goal for three days in a row. In particular at day 3, W1 has a counter value of 3 shown in counter 903. Synchronization operation 905 can be performed at this point in time which causes the phone to receive a streak value of 3 for the particular streak through the synchronization operation 905. Then a switch 907 occurs to watch W2 and the phone syncs to watch W2 in synchronization operation 909. During synchronization operation 909, the phone provides to watch W2 the streak value or counter value of 3 which was obtained from watch W1 during synchronization 905. At the time of the synchronization 909, watch 2 had a counter value of 1 for that physical activity event, and so the watch W2 compares its local value of 1 to the value of 3 received from the phone during synchronization operation 909 and selects the larger value because the merger strategy is to select the larger value ("largest wins"). Thus, the counter value for the streak on watch W2 becomes 3 as a result of the merger to create the merged value of 3. After the fourth day, the count is incremented to a value (counter value) of 4 on watch W2. For the next two days, day 5 and day 6, a counter value is incremented on each day so that at the end of day 6, the counter value has a value of 6 for the streak, which indicates that the user has continued to achieve the goal for the particular category, such as a standing goal of standing for at least 60 minutes each day. It will be appreciated that in one embodiment, both watch 1 and watch 2 are performing the method shown in FIG. 4 and can use the components shown in FIG. 5A. Moreover, the method shown in FIG. 6A can be performed each time a "new" watch synchronizes with the phone, such as synchronization operations 905, 909, 911, and 914. After day 6, a synchronization operation 911 is performed in which health data, including achievements and streak values are synchronized to the phone by transmitting those values from the watch W2 to the phone in synchronization operation 911. Then in switch operation 912, the user switches from wearing watch 2 to wearing watch 1 (W1) and then a synchronization operation 914 occurs in which the phone synchronizes the watch 1 (W1). At the start of the synchronization process, watch 1 may still have its counter value of 3 for the streak which was in counter 903 during day 3. In certain instances, watch 1 may also have a counter value of 0 if it updates the counter value as a result of performing operation 603 to derive a current local value before synchronizing with the phone in synchronization operation 914. After synchronization operation 914, the watch W1 can perform the method shown in FIG. 6A, and in particular can compare the local counter value of 3 to the inbox value of 6 for the particular physical activity event which is a streak. In the case of that comparison of 6 to 3, the merger strategy dictates that the largest value wins and thus the merged value becomes 6 so watch W1 now has a counter value of 6 for the streak and the streak continues for day 7 and day 8. At the end of day 8 the counter value is 8 indicating the user has achieved a particular achievement goal for 8 consecutive days in a row. Depending on how the watch is configured with goals, an achievement notice can be provided to a user, etc. Even though there were two switches and multiple synchronizations, the streak was maintained over a period of eight days. Without the embodiments described herein, prior wearable devices in a set of wearable devices would not be able to obtain such a streak when the devices are switched over time.

Figure 9B:
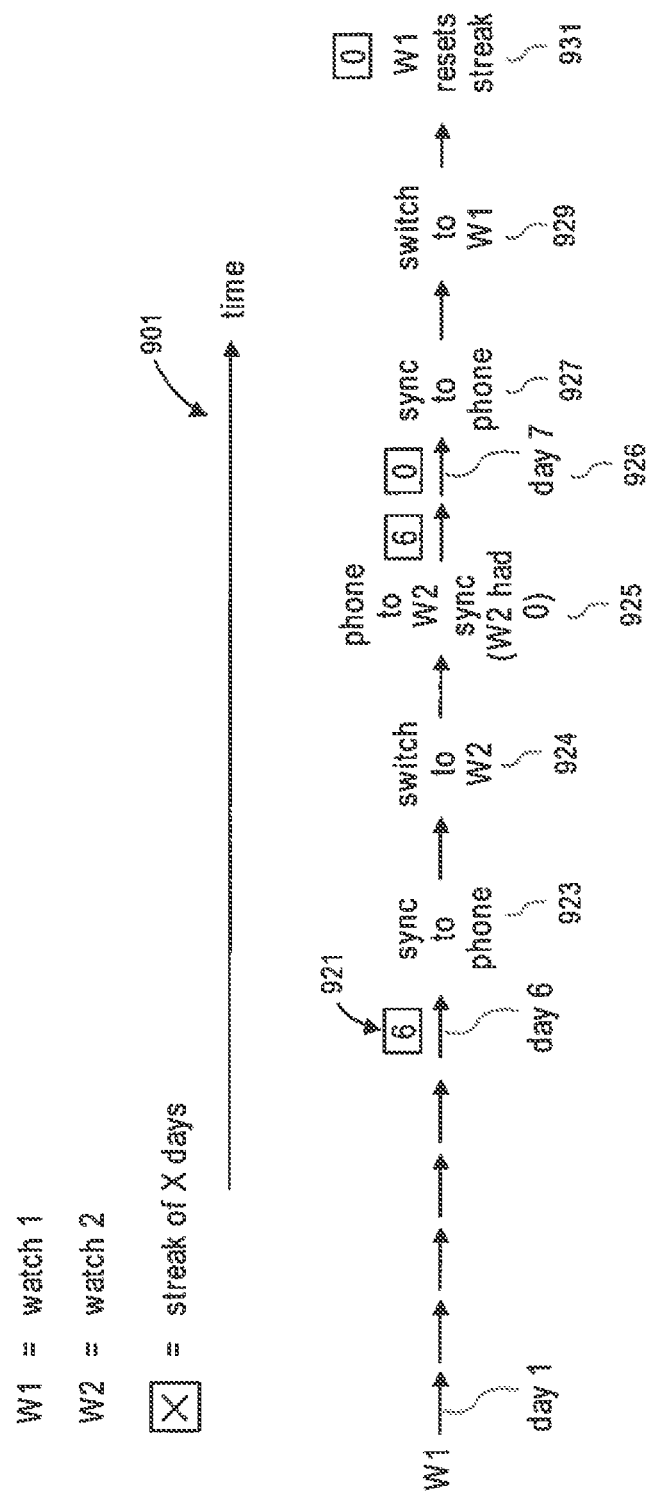
FIG. 9B is a diagram that shows, according to one embodiment, a streak being reset.

FIG. 9B shows an example in which a streak is reset for a first watch (W1). The sequence begins with the user wearing watch 1 at day 1. For six consecutive days the user achieves the achievement goal and thus the counter value is 6 in the counter 921. In synchronization operation 923, the watch W1 synchronizes with the phone and transmits the counter value of 6 for the particular physical activity event for the phone. Then the user switches watches to now wear watch 2 and watch 1 is no longer worn. The switch 924 can in one embodiment cause the phone to synchronize to watch W2 in synchronization operation 925. In that operation, the watch W2 had a counter value of 0 for the physical activity event and so the merger strategy dictates the merged value of 6 which was received from watch W1 in the synchronization operation 923. The user wears the watch W2 the next day but fails to achieve the achievement goal for the particular physical activity event. For example, if the achievement goal of physical activity event is a standing goal in which the user is required to stand for at least a predetermined period of time, the user failed to do so (e.g. the user was traveling in an airplane). Watch W2 and watch W1 in one embodiment will be performing the method shown in FIG. 4 and using the components shown in FIG. 5A on a daily basis in one embodiment and hence the counter value for the achievement goal will be reset to 0 in watch W2 in reset operation 926. The synchronization to the phone in synchronization operation 927 causes the counter value of 0 (and the date of the reset) to be provided to the phone in synchronization operation 927. The phone can deduce that a reset has occurred because it can see that the counter value has changed from 6 to 0. In one embodiment, each reset is associated with the date of the reset, and the date can be converted into a number which is described above. Switch operation 929 occurs in which the user now changes back to wearing watch W1 and no longer wears watch W2. The switch 929 includes a synchronization operation in which the phone syncs to watch W1. The result of that synchronization operation is to merge the 0 from watch W2 with the counter value of 6 for a reset type of event where the merger strategy is that the remote (in this case the phone) wins and thus the counter value is reset to 0 on the watch W1 in operation 931.

Figure 9C:
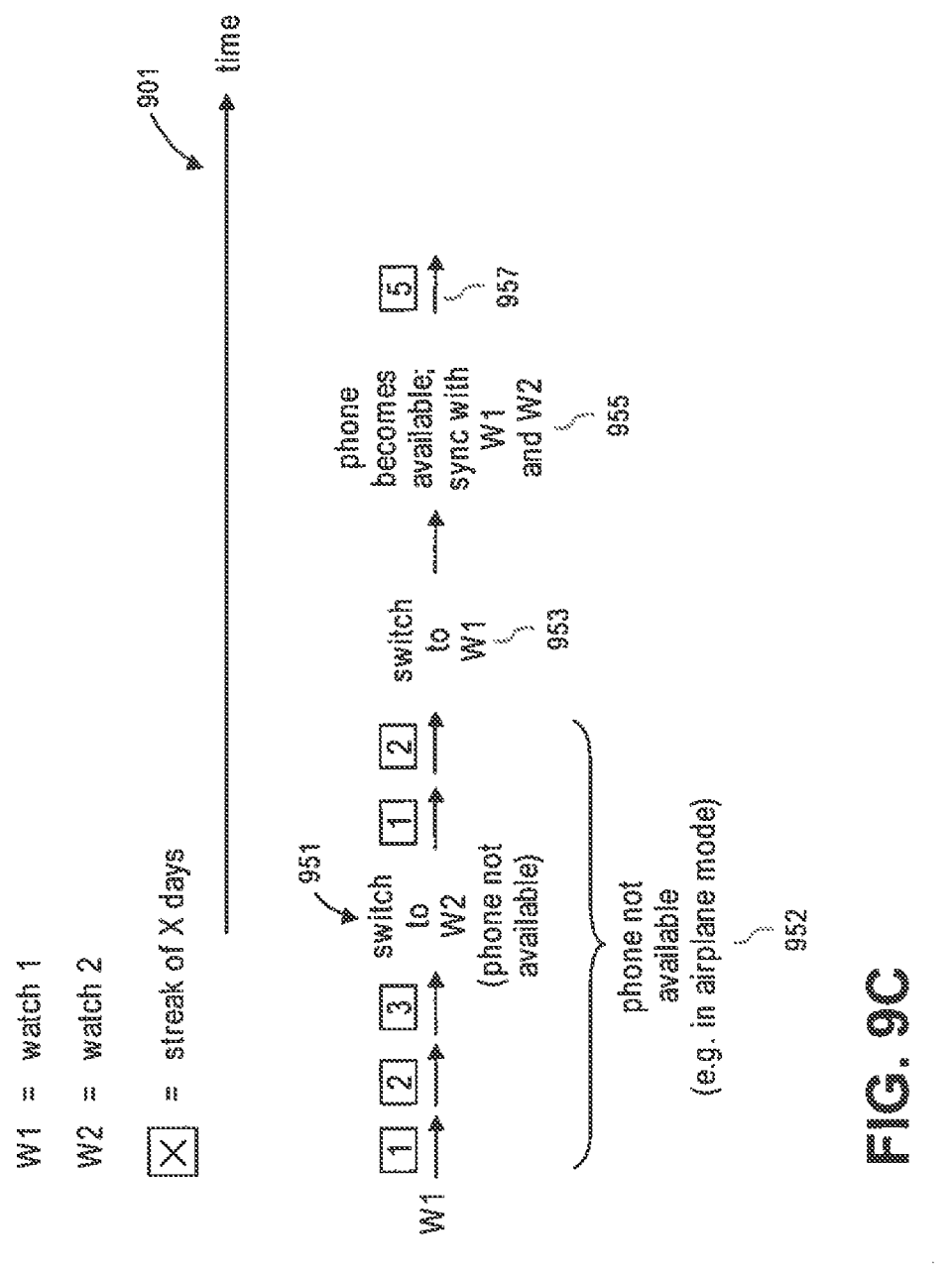

FIG. 9C shows an example of how an achievement correction system can run on the companion device, such as a phone in order to correct errors should they arise for a variety of different reasons. The example shown in FIG. 9 begins with the user wearing watch 1 for three days in a row and then switching to watch 2 after the third day. The user wears watch 2 for two consecutive days and then switches back to watch 1 in switch 953. The entire period of time 952 from the first to the fifth days includes the switch 951 and during that time 952 the phone is not available (for example it is in airplane mode or has been shut down during the entire time 952). Thus, the phone is not able to sync with either watch during this period of time when a switch 951 occurred. Watch W1 will have a counter value of 3 for a streak while watch 2 will have a counter value of 2 for the streak. At the time that the user switches to watch W1 in switch 953 the phone becomes available and performs a synchronization operation 955 with both watches W1 and W2. The achievement correction system in the phone can detect that the counter value of 2 and the counter value of 3 have not been previously synchronized with the phone and that they appear to be consecutive days, and thus the phone can select the addition of the two counter values to produce a merge value of 5 in operation 957 for the counter value for the streak. In one embodiment, the achievement correction system can run at least once each day using all of the data that the phone receives from all of the wearable devices to determine whether any of the counter values or other values used in the system are incorrect.

In one embodiment, each of the wearable devices and the companion device may perform a removal of duplicate achievements if the prior watch (or companion device) already gave the user notice of a particular achievement. This is done to minimize the number of notices given to a user in one embodiment. For example, an optional de-duplication operation 611 can be performed in the method shown in FIG. 6A and optional de-duplication performed in operation 703, and a de-duplication operation can also be performed after operation 639 in one embodiment. A method for performing the removal of duplicate achievements can be performed in the following manner according to one embodiment. Achievements can have, in one embodiment, four properties relative to determining whether they are equivalent for the purposes of de-duplications; these properties include achievement type, workout type (for workout achievements only), value, and date earned. Once the system has determined the two achievements are equivalent, the system can select which one to keep and which one to discard. In one embodiment, one of two de-duplication strategies can be used to pick which achievement to keep: either select the achievement with the earliest date earned (and discard the other) or select the achievement with the highest value (and discard the other). In one embodiment, the latter strategy of selecting the highest value to keep is used for all types of achievements except for: first workout of a particular type, move goal 200%, 300%, 400%, and 7-workout week. An example of a process for performing the de-duplication is as follows.

The process is as follows:
1. Determine whether to check value equality for this achievement type (the current type being processed).
2. Determine whether to check date equality for this achievement type, and if so, to what granularity of calendar unit (e.g. should we check that the dates are in the same day, week, or month)
3. Compare the properties of these achievements
   1. Type
   2. (Workout achievements only) Workout type
   3. Value (if specified)
   4. Date earned (if specified, down to the specified level of granularity)
   4. If all of those comparisons pass, they are equivalent. Choose a de-duplication strategy (either earliest date earned or highest value)
5. If equivalent, apply the de-duplication strategy to determine which achievement to keep: either discard the newly added achievement, or save the newly added achievement and delete the existing achievement in the database.

To determine whether to check the value, whether to check the date earned, and which de-duplication strategy to pick, the system looks up the achievement type in a hard-coded list in one embodiment:
De-Duplication Strategy
  Pick earliest date earned: First Workout of Type, Move Goal 200%/300%/400%, 7-Workout Week
  Pick highest value: everything else Achievement Types Requiring Equal Values New Move Goal, Perfect Week (Move/Exercise/Stand/All), Move Goal 200%/300%/400%, Move Goal Stream Earned Date Granularity Day: Best Day (Move/Exercise), Move Goal 200%/300%/400%, Perfect Week (Move/Exercise/Stand/All)

Week: 7-Workout Week

Month: Perfect Month

The various embodiments described herein can be implemented in an architecture in which only one watch is permitted to be the active watch. In an alternative embodiment, the various methods and systems described herein can be used in an architecture which permits multiple active paired watches.

In the embodiments described above, the new active watch is synchronized with data, such as health data that originated from the prior active watch, that is provided from the companion device (such as the side store on the companion device). In an alternative embodiment, this data can be provided to the new active watch from a different source, such as a server coupled to a network or directly from the prior active watch.

Figure 10:
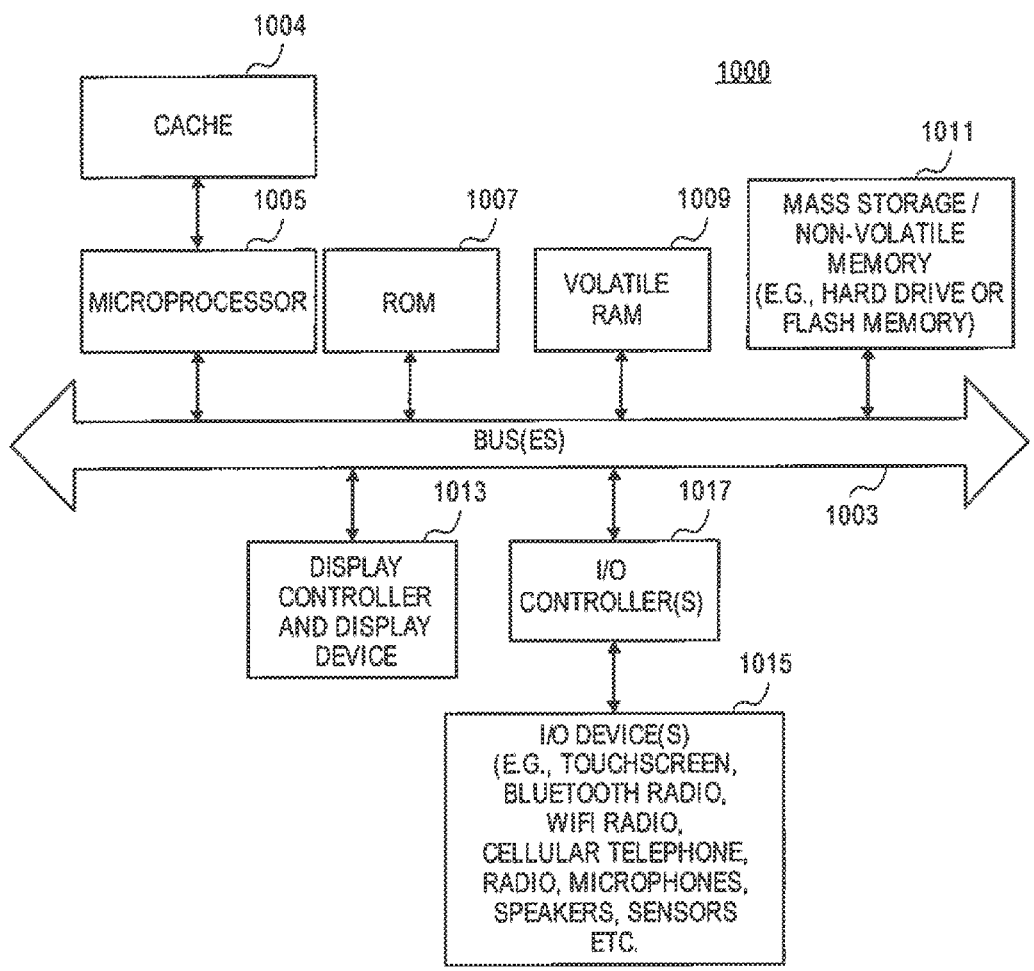
FIG. 10 is a block diagram of an example of a data processing system that can be used to implement or perform one or more embodiments described herein.

FIG. 10 shows one example of a data processing system, which may be used with any one of the embodiments described herein. Note that while FIG. 10 illustrates various components of a data processing system such as a companion device or a paired accessory, it is not intended to represent any particular architecture or manner of interconnecting the components as such details are not germane to this description. It will also be appreciated that consumer electronic devices and other data processing systems which have fewer components or perhaps more components may also be used with one or more embodiments described herein.

As shown in FIG. 10, the computer system 1000, which is a form of a data processing system, includes a bus 1003 which is coupled to one or more microprocessor(s) 1005 and a ROM (Read Only Memory) 1007 and volatile RAM 1009 (e.g. DRAM) and a non-volatile memory 1011. The one or more microprocessors 1005 are coupled to optional cache 1004. The one or more microprocessors 1005 may retrieve stored computer programs instructions from one or more of the non-transitory memories 1007, 1009 and 1011 and execute the instructions to perform operations described above. These memories represent examples of machine readable non-transitory storage media that can store or contain computer program instructions which when executed cause a data processing system to perform the one or more methods described herein. The bus 1003 interconnects these various components together and also interconnects these components 1005, 1009 and 1011 to a display controller and display device 1013 and to peripheral devices such as input/output (I/O) devices 1015 which may be one or more of sensors (such as the sensors 206), mice, touch screens, touch pads, touch sensitive input devices, keyboards, dedicated keys (e.g. buttons for volume or mute or home, etc.) modems, network interfaces, Bluetooth radio systems, printers and other devices which are well known in the art. Typically, the input/output devices 1015 are coupled to the system through input/output controllers 1017 as is known in the art. The volatile RAM (Random Access Memory) 1009 is typically implemented as dynamic RAM (DRAM) which requires power continually in order to refresh or maintain the data in the memory.

The mass storage 1011 is typically a magnetic hard drive or a magnetic optical drive or an optical drive or a DVD RAM or a flash memory or other types of memory system which maintain data (e.g., large amounts of data) even after power is removed from the system. Typically the mass storage 1011 will also be a random access memory although this is not required. While FIG. 10 shows that the mass storage 1011 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

The present disclosure recognizes that the use of personal information data (such as health data collected by one or more watches), in the present technology, can be used to the benefit of users. For example, the personal information data can be used to deliver health related information or targeted content that is of greater interest to the user. Accordingly, use of such personal information data can enable calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health information or advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information. In yet another example, users can select not to provide pertinent health information such as weight, personal characteristics, traits, etc.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A first wearable device that is paired with a companion device that is also paired with a second wearable device, the second wearable device having been worn during a first time period that precedes a second time period, the first wearable device comprising:
   one or more sensors;
   a display;
   a memory;
   a radio transceiver configured to wirelessly communicate with the companion device; and
   a processing system coupled to the one or more sensors and to the display and to the memory and to the radio transceiver, the processing system is configured to receive through the radio transceiver during the second time period a first value from the companion device, wherein the first value indicates an aspect of a physical activity event and the first value was derived from data collected by the second wearable device during the first time period, and the processing system is configured to compare a second value stored in the memory to the first value and is configured to determine a merged value based on the comparison and is configured to store the merged value in the memory.

2. The first wearable device as in claim 1 wherein the first wearable device is one of a watch or an audio accessory or a visual accessory and wherein the aspect is a duration of the physical activity event which is defined by physical data collected by the one or more sensors.

3. The first wearable device as in claim 2 wherein the one or more sensors comprise one or more of:
   an accelerometer;
   a gyroscope;
   a heart rate sensor; or
   a pulse sensor.

4. The first wearable device as in claim 3 wherein the duration is a streak and the first wearable device and the second wearable device cumulatively count the streak across both the first and the second time periods.

5. The first wearable device as in claim 4 wherein the merged value is determined based on a merger strategy for a type of the physical activity event; and wherein the processing system is configured to notify a user of an achievement based on the duration exceeding an achievement goal.

6. A machine implemented method comprising:
   receiving, at a wearable device in a first worn state, a first value from a companion device, wherein the first value indicates an aspect of a physical activity event and the first value was derived from data collected by another wearable device in a prior worn state occurring at a time different from and prior to the first worn state;
   comparing the first value to a second value stored on the wearable device;
   determining a merged value based on the comparing; and
   storing the merged value on the wearable device.

7. The method as in claim 6 wherein the merged value is a counter value and the aspect is a duration of the physical activity event.

8. The method as in claim 7 wherein the physical activity event is defined by physical data collected by one or more sensors; and wherein each event has an associated type; and wherein the duration is streak and the wearable device and the another wearable device cumulatively count the streak across both the first worn state and the prior worn state.

9. The method as in claim 8, wherein the method further comprises: incrementing the counter value on the wearable device in response to the collection of data, the incrementing indicating that the duration of the physical activity event has increased.

10. The method as in claim 9, wherein the method further comprises: notifying a user of an achievement based on the duration exceeding an achievement goal.

11. The method as in claim 6, the method further comprising:
   removing duplicate notifications of an achievement;
   notifying a user of the achievement based on the aspect exceeding an achievement goal;
   wherein the removing of duplicate notifications prevents a second notification of the achievement.

12. The method as in claim 8, the method further comprising: resetting the counter value to an initial value when the determining of the merged value indicates the streak was broken.

13. The method as in claim 8 wherein the physical activity event has an associated type and wherein the determining of the merged value uses a merger strategy that is based on the associated type; wherein the associated type is one of: streaks; bests; first seen values; or streak resets; and wherein the merger strategy is one of: largest wins for streaks and bests; smallest wins for first seen values; or remote wins for streak resets.

14. The method as in claim 6 wherein the wearable device is a watch or an audio accessory or visual accessory and one or more sensors include one or more of:
   an accelerometer;
   a gyroscope;
   a heart rate sensor; or
   a pulse sensor.

15. A non-transitory machine readable medium storing executable program instructions which when executed by a data processing system cause the data processing system to perform a method comprising:
   receiving, at a wearable device in a first worn state, a first value from a companion device, wherein the first value indicates an aspect of a physical activity event and the first value was derived from data collected by another wearable device in a prior worn state occurring at a time different from and prior to the first worn state;
   comparing the first value to a second value stored on the wearable device;
   determining a merged value based on the comparing; and
   storing the merged value on the wearable device.

16. The medium as in claim 15 wherein the merged value is a counter value and the aspect is a duration of the physical activity event.

17. The medium as in claim 16 wherein the physical activity event is defined by physical data collected by one or more sensors; and wherein each event has an associated type; and wherein the duration is streak and the wearable device and the another wearable device cumulatively count the streak across both the first worn state and the prior worn state.

18. The medium as in claim 17, wherein the method further comprises: incrementing the counter value on the wearable device in response to the collection of data, the incrementing indicating that the duration of the physical activity event has increased.

19. The medium as in claim 18, wherein the method further comprises: notifying a user of an achievement based on the duration exceeding an achievement goal.

20. The medium as in claim 15, the method further comprising:
- removing duplicate notifications of an achievement;
- notifying a user of the achievement based on the aspect exceeding an achievement goal;
- wherein the removing of duplicate notifications prevents a second notification of the achievement.

21. The medium as in claim 17, the method further comprising: resetting the counter value to an initial value when the determining of the merged value indicates the streak was broken.

22. The medium as in claim 17 wherein the physical activity event has an associated type and wherein the determining of the merged value uses a merger strategy that is based on the associated type; wherein the associated type is one of:
- streaks;
- bests;
- first seen values; or
- streak resets; and wherein the merger strategy is one of:
- largest wins for streaks and bests;
- smallest wins for first seen values; or
- remote wins for streak resets.

23. The medium as in claim 15 wherein the wearable device is a watch or an audio accessory or visual accessory and one or more sensors include one or more of:
- an accelerometer;
- a gyroscope;
- a heart rate sensor; or
- a pulse sensor.

* * * * *